United States Patent
Bonshor

(10) Patent No.: US 8,025,263 B2
(45) Date of Patent: *Sep. 27, 2011

(54) BI-DIRECTIONAL MOUNTING BRACKET ASSEMBLY FOR EXTERIOR SIDING

(75) Inventor: David James Bonshor, Surrey (CA)

(73) Assignee: Tapco International Corporation, Wixon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/816,230

(22) Filed: Jun. 15, 2010

(65) Prior Publication Data

US 2010/0308193 A1     Dec. 9, 2010

Related U.S. Application Data

(63) Continuation of application No. 12/510,016, filed on Jul. 27, 2009, now Pat. No. 7,735,790, which is a continuation of application No. 11/459,657, filed on Jul. 25, 2006, now Pat. No. 7,566,034.

(60) Provisional application No. 60/712,523, filed on Aug. 31, 2005.

(51) Int. Cl.
A47F 5/08     (2006.01)

(52) U.S. Cl. ............. 248/205.1; 248/906; 52/60; 52/97; 174/67; 454/275; 454/276

(58) Field of Classification Search ............... 52/60, 61, 52/97, 204.54, 209, 220.8, 302.1, 199, 212, 52/473, 716.2; 248/205.1, 906; 174/58, 174/66, 67; 454/275, 276, 277; 220/241, 220/242

See application file for complete search history.

(56) References Cited

U.S. PATENT DOCUMENTS

| | | | |
|---|---|---|---|
| 2,777,405 | A | 1/1957 | Ager |
| 4,112,691 | A | 9/1978 | Ebeling et al. |
| 4,381,063 | A | 4/1983 | Leong |
| 4,391,068 | A | 7/1983 | Kosar |
| 4,646,488 | A | 3/1987 | Burns |
| 4,726,152 | A | 2/1988 | Vagedes et al. |
| 4,875,318 | A | 10/1989 | MacLeod et al. |
| 4,920,708 | A | 5/1990 | MacLeod et al. |
| 4,956,948 | A | 9/1990 | Hart |
| 5,000,409 | A | 3/1991 | MacLeod et al. |
| 5,018,333 | A | 5/1991 | Bruhm |
| 5,133,165 | A | 7/1992 | Wimberly |
| 5,303,522 | A | 4/1994 | Vagedes |
| 5,326,060 | A | 7/1994 | Chubb et al. |
| 5,369,922 | A | 12/1994 | Hansen |
| 5,397,093 | A | 3/1995 | Chubb et al. |

(Continued)

*Primary Examiner* — Brian E Glessner
*Assistant Examiner* — James J Buckle, Jr.
(74) *Attorney, Agent, or Firm* — Howard & Howard Attorneys PLLC

(57) ABSTRACT

An bi-directional mounting bracket assembly is utilized in conjunction with exterior siding that covers sheathing of an exterior wall. A base member of the assembly has a mounting flange secured to the sheathing and a wall arrangement that projects outward with respect to the sheathing and from the mounting flange. Preferably, the wall arrangement supports a raised central panel used for mounting of fixtures. The wall arrangement preferably has four walls extending laterally between the mounting flange and the central panel. Spaced radially outward from the two adjacent walls are respective first and second drip ledges, and spaced radially outward from the other two adjacent walls are respective first and second baffle sets. When the assembly is mounted to the sheathing, a selective one of the two drip ledges is disposed substantially horizontally and beneath the wall arrangement for shedding of water. The baffle set adjacent to the horizontal drip ledge cascades water downward and generally toward the respective wall to channel water upon the horizontal drip ledge.

19 Claims, 2 Drawing Sheets

U.S. PATENT DOCUMENTS

| | | | |
|---|---|---|---|
| 5,526,619 A | 6/1996 | Vagedes | |
| 5,549,266 A | 8/1996 | Mitchell et al. | |
| 5,594,206 A | 1/1997 | Klas et al. | |
| 5,675,940 A | 10/1997 | Bahar et al. | |
| 5,722,208 A | 3/1998 | Humphrey et al. | |
| 5,918,431 A | 7/1999 | Scheidegger et al. | |
| 6,070,375 A | 6/2000 | Anderson et al. | |
| 6,076,310 A | 6/2000 | Kim | |
| 6,098,343 A | 8/2000 | Brown et al. | |
| 6,119,416 A | 9/2000 | Larson | |
| 6,151,838 A | 11/2000 | Husein | |
| 6,155,008 A | 12/2000 | McKee | |
| 6,429,371 B2 | 8/2002 | Scheidegger et al. | |
| 6,553,735 B1 | 4/2003 | Wang Chen | |
| D475,440 S | 6/2003 | Sawyer | |
| 6,610,927 B2 | 8/2003 | Dinh et al. | |
| 6,780,100 B1 | 8/2004 | Gretz | |
| 6,825,414 B2 | 11/2004 | Vagedes | |
| 6,904,725 B1 | 6/2005 | Hansen et al. | |
| 6,951,081 B2 | 10/2005 | Bonshor | |
| RE38,881 E | 11/2005 | Chubb et al. | |
| 7,096,627 B2 | 8/2006 | Wade | |
| 7,107,736 B2 | 9/2006 | Banard | |
| 7,408,111 B2 | 8/2008 | Clark et al. | |
| 7,610,726 B2 | 11/2009 | Lajewski | |
| 7,748,174 B2 | 7/2010 | Bonshor | |
| 2001/0015281 A1 | 8/2001 | Scheidegger et al. | |
| 2003/0041539 A1 | 3/2003 | Bernacki et al. | |
| 2003/0177725 A1 | 9/2003 | Gatherum | |
| 2006/0213132 A1 | 9/2006 | Bonshor | |
| 2006/0260216 A1 | 11/2006 | Bonshor | |
| 2006/0261636 A1 | 11/2006 | Bonshor | |
| 2006/0277857 A1 | 12/2006 | Bonshor | |
| 2007/0044393 A1 | 3/2007 | Bonshor | |
| 2007/0044401 A1 | 3/2007 | Bonshor | |
| 2007/0175168 A1 | 8/2007 | Bonshor | |
| 2008/0149792 A1 | 6/2008 | Nurenberg et al. | |
| 2008/0256880 A1 | 10/2008 | Nurenberg et al. | |

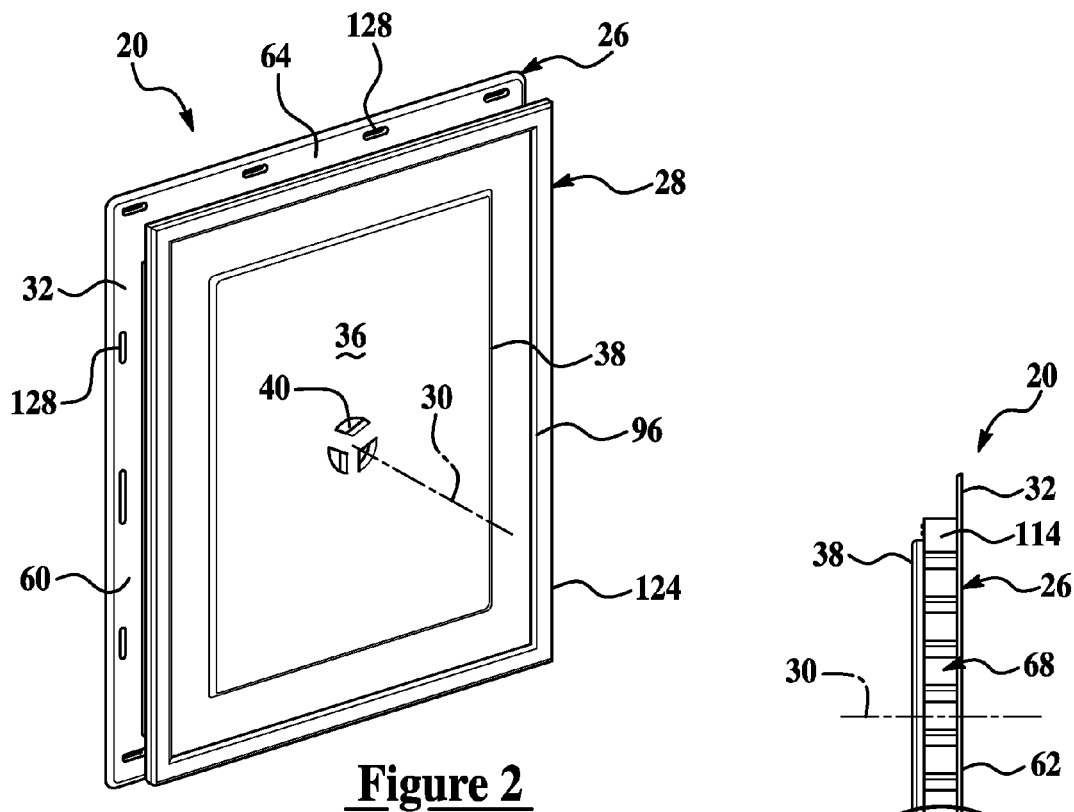
Figure 2
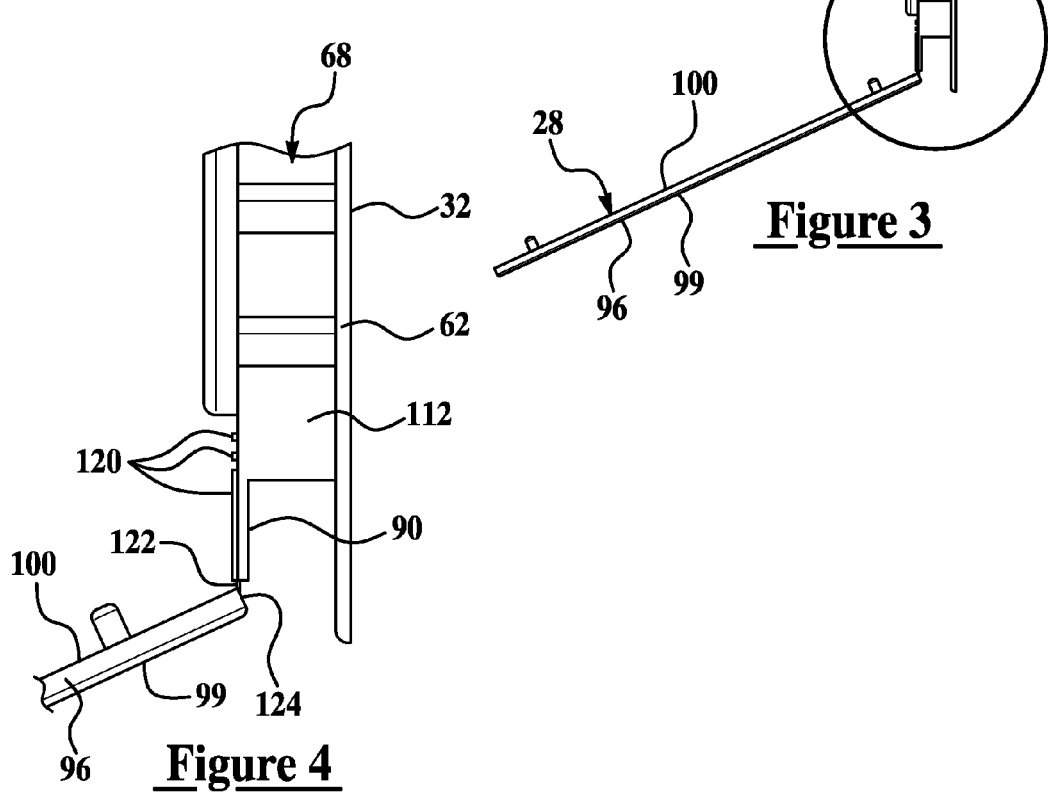
Figure 3
Figure 4

BI-DIRECTIONAL MOUNTING BRACKET ASSEMBLY FOR EXTERIOR SIDING

RELATED APPLICATIONS

This patent application is a continuation application of U.S. patent application Ser. No. 12/510,016, now U.S. Pat. No. 7,735,790, filed Jul. 27, 2009, which is a continuation application of U.S. patent application Ser. No. 11/459,657, now U.S. Pat. No. 7,566,034, filed Jul. 25, 2006, which claims priority to and all advantages of U.S. Provisional Patent Application No. 60/712,523 which was filed on Aug. 31, 2005.

FIELD OF THE INVENTION

The subject invention generally relates to an exterior siding mounting bracket assembly and more particularly to a bi-directional mounting bracket assembly.

BACKGROUND OF THE INVENTION

Common in residential building structures, sheathing of an exterior wall is known to be covered with a siding material typically made of cedar, aluminum, plastic or other synthetic material often made to appear like wood. Often, various exterior appendages of the home such as cloths dryer vents, exterior light fixtures, electrical outlets, and water spigots must be trimmed-out around the siding for aesthetic reasons. This is commonly done with a mounting bracket. One such example of a known mounting bracket is taught in U.S. Pat. No. 4,920,708, assigned to the same assignee as the present invention and incorporated herein by reference in its entirety. The known mounting bracket has an internal base member that snap fits to an external trim member along an axis disposed perpendicular to the sheathing and during assembly. The base member has a continuous flange that projects radially outward and is typically nailed to the sheathing under the siding. Projecting axially or laterally outward from the flange and to an inner central panel is a continuous wall. Generally, the wall defines the perimeter of the central panel. A cutout communicates through the panel and has a shape generally dictated by the appendage projecting through it.

The trim member typically has a continuous partition that projects laterally and axially inward toward the base member, and an aesthetically pleasing flange that projects radially outward from the partition. An opening is generally defined by the partition and receives the wall and central panel when the bracket is assembled. The partition is generally shaped to conform with the wall. Multi-positional snap fit features are known to be carried between a radially outward surface of the wall and a radially inward surface of the partition. When the bracket is assembled, the close proximity of the partition to the wall causes the feature to lock the partition and wall together.

During construction of the building, once the base member is secured to the wall or sheathing, the siding material is installed over the sheathing and over the flange. The siding, however, must be trimmed so that it is slightly spaced from the continuous wall of the base member. This spacing allows room for entry of the continuous partition of the trim piece, yet is close enough to the wall of the bracket so that the ends are aesthetically concealed by the outer flange of the trim member which is substantially flush to the siding. Unfortunately, the siding is typically exposed to rain or water which flows down the siding and beneath the exterior flange. This water can accumulate and seep beneath the concealed ends of the siding and against the mounting flange of the base member. Accumulation of water directly against the mounting flange can cause water propagation outward from the wall of the base member and beyond the mounting flange, thus exposing the sheathing to moisture. The retained moisture can potentially create a host of problems including the rot of wood, disintegration of simulated materials and the attraction of unwanted insects.

To reduce or eliminate this water seepage, various bracket assemblies are known to be self-flashing for diverting water run-off away from the sheathing. One such bracket is taught in U.S. Patent Application Publication No. 2003/0136060 A1, published Jul. 24, 2003 and incorporated herein by reference in its entirety. Unfortunately, known self-flashing bracket assemblies can be mounted in one position only. Particularly, oblong or rectangular bracket assemblies must be separately manufactured with distinct features for horizontal and vertical orientations. This requires separate manufacturing molds/tooling and can complicate shipping and stocking of the product.

SUMMARY OF THE INVENTION AND ADVANTAGES

A bi-directional mounting bracket assembly is utilized in conjunction with exterior siding that covers sheathing of an exterior wall. A base member of the assembly has a mounting flange secured to the sheathing and a continuous wall arrangement that projects outward with respect to the sheathing and from the mounting flange. Preferably, the wall arrangement supports a raised central panel used for mounting of fixtures. The wall arrangement preferably has four walls extending laterally between the mounting flange and the central panel. Spaced radially outward from the two adjacent walls are respective first and second drip ledges, and spaced radially outward from the other two adjacent walls are respective first and second baffle sets. When the assembly is mounted to the sheathing, a selective one of the two drip ledges is disposed substantially horizontally and beneath the wall arrangement for shedding of water. The baffle set adjacent to the horizontal drip ledge cascades water downward and generally toward the respective wall to channel water upon the selected horizontal drip ledge.

Preferably, the wall arrangement and central panel are rectangular is shape thus the first drip ledge is shorter than the second drip ledge and the first baffle set has a linear length shorter than the second baffle set. An exterior trim member or flange preferably snap fits to the base member for covering the cut edges of the siding, the baffle sets, and the drip ledges.

Features, advantages and benefits of the present invention include a mounting bracket assembly having an irregular or rectangular shape that can be selectively mounted in at least two positions without degrading the assemblies self-flashing and water shedding capability. Other advantages include improved water shedding capabilities that eliminates or reduces exposure of the sheathing to moisture that could cause damage to structural material and potentially attract unwanted insects. The assembly reduces or eliminates of structural maintenance, has a design that is relatively simple, robust and versatile, and is inexpensive to manufacture and easy to install.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of the mounting bracket assembly illustrated in an assembled state;

FIG. 3 is a side view of the mounting bracket assembly in the unassembled state; and FIG. 4 is an enlarged partial view of the mounting bracket assembly taken from circle 4 of FIG. 3.

DETAILED DESCRIPTION OF THE PREFERRED EMBODIMENT

Figure 1:
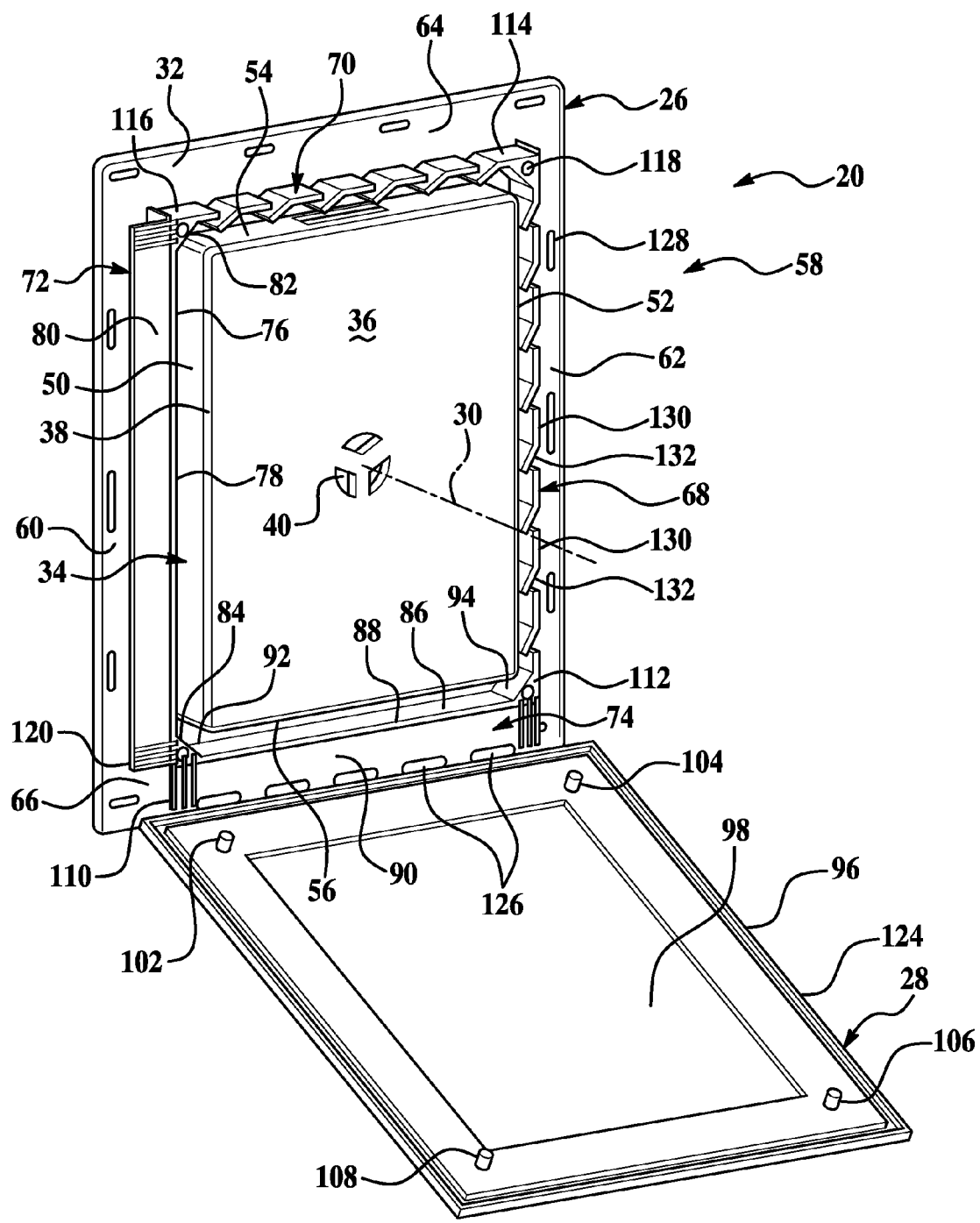
FIG. 1 is a perspective view of a bi-directional mounting bracket assembly embodying the present invention and illustrated in a vertical position and an unassembled state.

As best illustrated in FIGS. 1-4, a bi-directional mounting bracket assembly 20 embodying the present invention generally projects or is exposed through exterior siding (not shown) of a substantially vertical wall of any variety of buildings or residential structures exposed to inclement weather such as rain and generally water runoff. The assembly 20 provides an aesthetically pleasing surface for which any variety of exterior components can be easily mounted or project therefrom. Such components include but are not limited to hose spigots, electrical receptacles, clothes dryer vents, and light fixtures.

The assembly 20 is fastened to a substructure of the exterior wall preferably prior to placement of the siding. The substructure is generally an underlayment or sheathing that is preferably covered by the siding material. The mounting bracket assembly 20 is generally self-flashing for the prevention of water seepage beneath the siding, and has a base member 26 secured to the sheathing and a trim member 28 that preferably snap fits to the base member 26 along an axis 30 preferably disposed substantially perpendicular to the sheathing.

The base member 26 is generally a rectangular shape (as oppose to square or round) and can be mounted in two selective positions, preferably vertical or horizontal. The base member 26 has a mounting flange 32 and a rectangular wall arrangement 34 (see FIGS. 4-6). The flange 32 projects radially outward from the wall arrangement 34 and is typically nailed to the sheathing. The wall arrangement 34 projects axially or laterally outward from the flange 32 and preferably to a radially inward and rectangular facial or central panel 36 spaced from and orientated substantially parallel to the underlayment. Generally, the central panel 36 is that portion of the base member 26 that is exposed through the siding with the wall arrangement 34 defining or carrying a substantially rectangular perimeter 38 of the central panel 36 at its distal edge. A cutout 40 preferably communicates through the panel 36 and has a shape generally dictated by the component or appendage projecting through it (not shown).

Preferably the rectangular wall arrangement 34 of the base member 26 has a first wall 50, a second wall 52, a third wall 54 and a fourth wall 56. When the assembly 20 is in a vertical position 58 (i.e. the first and second walls 50, 52 are longer than the third and fourth walls 54, 56) and as illustrated in FIG. 1, the first and second walls 50, 52 are substantially vertical, thus being left and right side walls, respectively. Similarly, the third and fourth walls 54, 56 are substantially horizontal, thus being top and bottom walls, respectively. The flange 32 of the base member 26 has a left portion 60 associated with the left side wall 50, a right portion 62 associated with the right side wall 52, a top portion 64 associated with the top wall 54, and a bottom portion 66 associated with the bottom wall 56. Because the assembly 20 is bi-directional, the base member 26 can be rotated about ninety degrees counter-clockwise moving the assembly from the vertical position as illustrated in FIG. 1 and into a horizontal position (not shown). When in the horizontal position, the longer first wall 50 is the bottom wall, the longer second wall 52 is the top wall, the shorter third wall 54 is the left side wall and the shorter fourth wall 56 is the right side wall.

Referring to FIGS. 1 and 3, two sets of sloped baffles 68, 70 of the base member 26 are formed to and project axially outward from adjacent portions 62, 64 of the mounting flange 32, respectively, for channeling water generally radially inward, with respect to axis 30, toward the respective second and third walls 52, 54, respectively. Each baffle set 68, 70 are arranged in a linear fashion generally forming a line that is spaced radially outward from and substantially parallel to respective second and third walls 52, 54 of the rectangular wall arrangement 34.

Projecting laterally outward from the first or left portion 60 and the fourth or bottom portion 66 of the flange 32 are respective drip ledges 72, 74. The elongated drip ledges 72, 74 extend substantially parallel to and are spaced radially outward from respective first and fourth walls 50, 56. Drip ledge 72 has a shelf portion 76 engaged directly to the left portion 60 of the flange 32 and projecting laterally outward therefrom to a drip edge 78. Projecting laterally outward from the drip edge 78 and radially outward with respect to axis 30 is a draped portion 80 of the drip ledge 72. Contiguous to the ends of the shelf portion 76 and the left portion 60 are respective end dams 82, 84 for diverting water over the drip edge 78 when the assembly 20 is in the horizontal position. Similarly, the drip ledge 74 has a shelf portion 86 engaged directly to the bottom portion 66 of the flange 32 and projecting laterally outward therefrom to a drip edge 88. Projecting laterally outward from the drip edge 88 and radially outward with respect to axis 30 is a draped portion 90 of the drip ledge 74. Contiguous to the ends of the shelf portion 86 and the bottom portion 66 are respective end dams 92, 94 for diverting water over the drip edge 88 when the assembly 20 is in the vertical position.

The trim member 28 has an exterior flange 96 that defines a substantially rectangular hole 98 contoured to accept the central panel 36 of the base member 26. The flange 96 has an external surface 99 designed to be aesthetically pleasing and an internal surface 100 that faces in an axial inward direction with respect to the axis 30. Located proximate to each of four corners of the exterior flange 96 and projecting in an axial inward direction with respect to axis 30 and from the internal surface 100 are four pins 102, 104, 106, 108. Each pin 102, 104, 106, 108 is associated with a respective bosses 110, 112, 114, 116 of the base member 26 each having a bore 118 for snug or locking receipt of the associate pins 102, 104, 106, 108 when the assembly 20 is assembled.

Preferably, boss 110 carries end dam 84 of drip ledge 72 and end dam 92 of drip ledge 74; boss 112 carries end dam 94 of drip ledge 74; boss 114 is generally a corner fitting between baffle sets 68, 70; and boss 116 carries end dam 82 of drip ledge 72. A series of spacers or ribs 120 project axially outward from each draped portion 80, 90 for spacing the internal surface 100 of the exterior flange 96 away from the drip ledges 72, 74 to assure that water does not dam behind the trim member 28. A living hinge 122 is preferably carried between the distal edge of draped portion 90 of drip ledge 74 and an outer perimeter 124 of the exterior flange 96. The living hinge 122 preferably has a series of linearly aligned slots 126 for the drainage of water when the assembly 20 is in the vertical position 58.

The bi-directional mounting bracket assembly 20 is preferably one unitary injection molded plastic part. During installation of the assembly 20, the installer first selects the desired vertical or horizontal position. When selected, the installer assures that one of the two drip ledges 72, 74 are near the bottom of the base member 26. The flange 32 of the base member 26 is then fastened or preferably nailed to the sheathing. Preferably the mounting flange 32 has holes 128 for receipt of nails or screws for this attachment.

With the base member 26 secured to the sheathing, the siding is appropriately trimmed during installation placing the siding over the mounting flange 32 and beneath the draped portions 80, 90 of respective drip ledges 72, 74. The siding is also trimmed so that the cut edges are radially outward from and abut or are substantially near to planar segments 130 of each baffle of the baffle sets 68, 70, and abut or are substantially near to the shelf portions 76, 86 of respective drip ledges 72, 74. With the siding installed, the trim member 28 is pivoted about the living hinge 122 until the pins 102, 104, 106, 108 are press fitted into the respective bosses 110, 112, 114, 116. When completely installed, the trim member 28 covers the cut ends of the siding along with the baffle sets 68, 70 and drip ledges 72, 74 of the base member 26 for a pleasing appearance.

In operation and during inclement weather, water intrusion, or rain water cascading down the siding from above the mounting bracket assembly 20 will flow beneath the exterior flange 96. When the assembly 20 is in the vertical position 58 as illustrated in FIG. 1, the baffle set 70 is generally inactive since gravity will cause water to impinge upon the adjacent top wall 54 regardless of the baffle set's presence. Each baffle of the generally vertical baffle set 68, however, has a sloped segment 132 that projects downward from the planar segment 130 and toward the left causing the water to cascade downward from one sloped segment 132 to the next and until the water is diverted upon the shelf portion 86 of the drip ledge 74 proximate to the end dam 94. Any water flowing downward upon the first portion 60 of the mounting flange 32 is substantially channeled downward between the vertical shelf portion 76 of the drip ledge 72 and the first wall 50 of the wall arrangement 34 and is diverted upon the shelf portion 86 of the drip ledge 74 by the end dam 92. All water collected upon the shelf portion 86 flows over the drip edge 88 and through the space between the draped portion 90 and internal surface 100 of the exterior flange 96 created by the spacers 120. If the assembly 20 is mounted in the horizontal position instead of the vertical position 58 as illustrated, operation of the assembly is generally the same except that the functions of the drip ledges 72, 74 are reversed, and the functions of the baffle sets 68, 70 are reversed.

The invention has been described in an illustrative manner, and it is to be understood that the terminology which has been used is intended to be in the nature of words of description rather than of limitation. For instance, the present invention is not limited to an assembly having a rectangular shape or a wall arrangement having only four walls. In fact, the assembly could be of any variety of irregular shapes wherein a choice of mounting positions is desirable. Obviously, many modifications and variations of the present invention are possible in light of the above teachings. It is, therefore, to be understood that reference numerals are utilized merely for convenience and are not to be limiting in any way, and that the invention may be practiced otherwise than as specifically described.

What is claimed is:

1. A mounting bracket assembly for an exterior wall having a substructure covered by siding, the mounting bracket assembly comprising:

a base member having a mounting flange for attachment to the substructure at least in part beneath the siding;

a trim member coupled to the base member and spaced from the mounting flange to conceal the base member;

a first series of baffles extending transversely from the mounting flange with each baffle of the first series of baffles spaced from each other generally along a line; and a first elongated drip ledge spaced from the first series of baffles to define a cavity between the first elongated drip ledge and the first series of baffles, the first elongated drip ledge extending transversely from the mounting flange for disposition below the first series of baffles when the base member is mounted to the substructure to divert the water from the cavity to an exterior of the siding;

wherein each baffle slopes toward the cavity for channeling water from the siding to the cavity so that the water can be diverted by the first elongated drip ledge from the cavity to the exterior of the siding.

2. The mounting bracket assembly as set forth in claim 1 wherein each baffle of the first series of baffles includes a planar segment and a sloped segment projecting transversely from the planar segment toward the cavity.

3. The mounting bracket assembly as set forth in claim 2 wherein the planar segments and the sloped segments of the first series of baffles are in alternating relationship along the line.

4. The mounting bracket assembly as set forth in claim 1 wherein each baffle of the first series of baffles are cantilevered from the mounting flange.

5. The mounting bracket assembly as set forth in claim 1 wherein the first elongated drip ledge includes a shelf portion extending transversely to the mounting flange and a draped portion spaced from the mounting flange and extending from the shelf portion in a direction away from the cavity.

6. The mounting bracket assembly as set forth in claim 5 further including spacers extending from the draped portion toward the trim member for spacing the trim member from the draped portion.

7. The mounting bracket assembly as set forth in claim 5 further including living hinge connecting the trim member and the draped portion of the first elongated drip ledge with the trim member selectively pivotable relative to first elongated drip ledge about the living hinge.

8. The mounting bracket assembly as set forth in claims 1 further including a wall arrangement extending from the base member between the first series of baffles and the first elongated drip ledge.

9. The mounting bracket assembly as set forth in claim 8 wherein the line along which the first series of baffles extends is spaced from and adjacent to the wall arrangement.

10. The mounting bracket assembly as set forth in claim 8 wherein the first elongated drip ledge is spaced from and adjacent to the wall arrangement.

11. The mounting bracket assembly as set forth in claim 8 further including a central panel extending from the wall arrangement and defining a cutout for receiving a component projecting through the mounting bracket assembly.

12. The mounting bracket assembly as set forth in claim 1 further including a second series of baffles extending transversely from the mounting flange with each baffle of the second series of baffles spaced from each other generally along a second line extending transversely to the line along which the first series of baffles extends for channeling water from the siding to the cavity.

13. The mounting bracket assembly as set forth in claim 12 further including a second elongated drip ledge extending transversely from the mounting flange and spaced from the second series of baffles for disposition below the second series of baffles when the base member is mounted to the substructure to divert the water from the cavity to the exterior of the siding.

14. The mounting bracket assembly as set forth in claim 13 wherein both of the first and second elongated drip ledges extend between ends and further including at least one boss at one of the ends for diverting water toward one of the elongated drip ledges.

15. The mounting bracket assembly as set forth in claim 14 wherein the boss defines a bore and wherein the trim member presents a pin extending into the bore for engaging the trim member to the base member.

16. A mounting bracket assembly for an exterior wall having a substructure covered by siding, the mounting bracket assembly comprising:

a base member having a mounting flange for attachment to the substructure at least in part beneath the siding;

a trim member coupled to the base member and spaced from the mounting flange to conceal the base member;

a first series of baffles extending transversely from the mounting flange with each baffle of the first series of baffles spaced from each other generally along a line;

a second series of baffles extending transversely from the mounting flange with each baffle of the second series of baffles spaced from each other generally along a second line extending transversely to the line along which the first series of baffles extends;

a first elongated drip ledge spaced from the first series of baffles to define a cavity between the first elongated drip ledge and the first series of baffles, the elongated drip ledge extending transversely from the mounting flange for diverting the water from the cavity to an exterior of the siding; and a second elongated drip ledge spaced from the second series of baffles and extending transversely from the mounting flange for diverting the water from the cavity to the exterior of the siding;

wherein the base member is mountable to the substructure in a first mounting position with the first elongated drip ledge disposed below the first series of baffles and a second mounting position different than the first mounting position with the second elongated drip ledge disposed below the second series of baffles; and wherein each baffle of the first and second series of baffles slope toward the cavity for channeling water from the siding to the cavity.

17. The mounting bracket assembly as set forth in claim 16 wherein the line and the second line extend along the mounting flange perpendicularly to each other.

18. The mounting bracket assembly as set forth in claim 17 wherein the first elongated drip ledge extends in parallel with the line and wherein the second elongated drip ledge extends in parallel with the second line.

19. The mounting bracket assembly as set forth in claim 16 wherein the base member extends along the cavity from the first series of baffles to the first elongated drip ledge and from the second series of baffles to the second elongated drip ledge.

\* \* \* \* \*